United States Patent [19]

Ryan et al.

[11] Patent Number: 4,520,658

[45] Date of Patent: Jun. 4, 1985

[54] METHOD OF LOCATING ENGINE TOP DEAD CENTER POSITION

[75] Inventors: William P. Ryan, Royal Oak; Thaddeus Schroeder, Sterling Heights, both of Mich.

[73] Assignee: General Motors Corporation, Detroit, Mich.

[21] Appl. No.: 556,790

[22] Filed: Dec. 1, 1983

[51] Int. Cl.³ .......... G01M 15/00
[52] U.S. Cl. .......... 73/117.3
[58] Field of Search .......... 73/116, 117.3, 117.2, 73/119 R; 364/551

[56] References Cited

U.S. PATENT DOCUMENTS 4,413,508 11/1983 Kawamura et al. .......... 73/116
4,453,402 6/1984 Grant .......... 73/117.2

*Primary Examiner*—Jerry W. Myracle
*Attorney, Agent, or Firm*—Howard N. Conkey

[57] ABSTRACT

The piston top dead center position of an engine is accurately determined by a non-intrusive method in which the engine instantaneous speed is recorded, the minimum point determined as an estimation of top dead center and the minimum point adjusted by a predetermined amount based on engine speed and combustion timing.

4 Claims, 4 Drawing Figures

METHOD OF LOCATING ENGINE TOP DEAD CENTER POSITION

This invention relates to an improved method for accurately locating the top dead center position of an internal combustion engine.

BACKGROUND OF THE INVENTION

Accuracy in engine control parameters has become increasingly important in reducing vehicle emissions and improving economy. One of the parameters significantly affecting emissions and economy is the timing of combustion in the cylinders of the vehicle engine. In a gas fueled engine, this timing involves the crankshaft angle location of spark. In a diesel fueled engine, the timing involves the crankshaft angle location of fuel injection.

In both gas and diesel engines, the crankshaft timing angles are referenced to the engine piston top dead center positions. Therefore, the accuracy of any control or diagnostic system for establishing or monitoring ignition timing can be no better than the accuracy of the location of piston top dead center which is the exact geometric position at which the motion of the piston and the engine cylinder reverses direction and at which the combustion chamber volume is at a minimum. It is apparent therefore that to accurately establish or monitor engine timing requires an accurate determination of the top dead center position of the pistons.

Numerous systems have been employed for providing an indication of the crankshaft angle at which the piston reaches a top dead center position. Some intrusive techniques such as the use of a dial indicator having a probe extending into the top of a cylinder, while being accurate, require access to the combustion chamber. Mechanical non-intrusive techniques have been employed which have the advantage of not requiring access to the combustion chamber but are generally inaccurate in their indication of piston top dead center. Other systems have been suggested but are generally complex in nature or do not provide the required accuracy modern engine control and diagnostic systems require.

SUMMARY OF THE INVENTION

It is well known that an internal combustion engine generates power in a cyclic fashion and that this causes cyclic variations in the engine speed. While these speed cycles are minimized by the engine flywheel, they can easily be measured, especially at engine idle speeds. The upper curve of FIG. 3 is illustrative of the cyclic variations in the engine speed of an internal combustion engine as the engine rotates through two revolutions of the crankshaft. Each of the speed cycles corresponds to a particular cylinder. The intervals of decreasing speed are related to compression strokes while intervals of increasing speed are related to power strokes. In a four-cycle engine, the number of speed cycles in two crankshaft revolutions is equal to the number of cylinders. Each minimum and maximum speed point occurs at crank angles where the net torque produced by the engine is equal to the total load torque. If the engine is operating with the transmission in neutral, the total load torque is very small in comparison to peak torque values generated by the engine. Consequently, each minimum speed point of the speed cycles of the engine nearly coincides with a corresponding piston top dead center location and provides for an approximation of the top dead center location. While serving as an approximation of top dead center, the location of the minimum speed point during each of the speed pulsations does not provide the accuracy required in establishing or diagnosing engine timing.

Applicants have discovered that a crankshaft angular relationship exists between the crankshaft angle at which the minimum speed point occurs during each of the engine speed cycles and top dead center of the corresponding piston in its compression stroke that is a function of the engine speed and, to a lesser degree, a function of combustion timing. Further, this functional relationship does not change for a given engine-transmission combination.

The functional relationship between the minimum speed point of a speed cycle and top dead center position of the engine may be determined by laboratory techniques. For example, precise top dead center location of an engine may first be determined by one of the known accurate intrusive top dead center location techniques, such as a probe sensing the movement of the piston in the cylinder. When the top dead center crankshaft angle of a cylinder has been precisely located in the engine, its angular relationship to the minimum speed point of the speed cycle corresponding to that cylinder as a function of engine speed and combustion timing can be measured. For example, by maintaining a constant combustion timing angle at 0 degrees, a speed dependent relationship can be determined by measuring the crank angle between the minimum speed point in the speed cycle and the previously located top dead center position for various values of engine speed. A combustion timing relationship can be determined by varying the combustion timing while measuring the crank angle between the minimum speed point in the speed cycle and the previously located top dead center position. The resulting data may then be stored in a digital memory to be utilized as correction angles either in a pair of two-dimensional look-up tables addressed respectively by engine speed and combustion timing as in the preferred embodiment or a single three-dimensional look-up table addressed by both engine speed and combustion timing.

An example of the speed and combustion timing dependent correction angles defining the relationship between the crankshaft angle at a piston top dead center and the crank angle at which the corresponding speed cycle is minimum is illustrated in FIG. 4. In accord with this invention, the top dead center position of an engine may be precisely located in a nonintrusive manner by observing the instantaneous speed, locating the crankshaft angular position at which the speed is minimum as an estimation of top dead center, and correcting the estimation in accord with the predetermined values such as represented in the FIG. 4 illustration and which are stored in memory. For example, if the average engine speed is 750 rpm and the combustion timing angle is 3° before top dead center, the correction angle determined from the engine data of FIG. 4 is 0.4 degrees. Top dead center is then precisely located by adding the correction factor of 0.4 degrees to the crankshaft angle at which the speed cycle is minimum.

In accord with the foregoing, it is a general object of this invention to provide an improved method for accurately locating the top dead center position of an internal combustion engine.

It is another object of this invention to provide an improved non-intrusive method for accurately locating the top dead center position of an internal combustion engine.

It is another object of this invention to provide an improved method for accurately locating piston top dead center of an internal combustion engine from the instantaneous engine speed profile of the engine.

It is another object of this invention to provide a method of locating piston top dead center position of an internal combustion engine by determining the crank angle at which the speed of the engine during each combustion cycle attains a minimum value and by correcting this crankshaft engine position as a function of predetermined engine operating parameters.

It is another object of this invention to provide for a method of locating piston top dead center position in an internal combustion engine by correcting the crankshaft angular location of the minimum speed during a combustion cycle based on a predetermined correction factor which is a function of engine speed and combustion timing.

These and other objects of this invention may be best understood by reference to the following description of a preferred embodiment and the drawings in which:

DESCRIPTION OF THE PREFERRED EMBODIMENT

Figure 1:
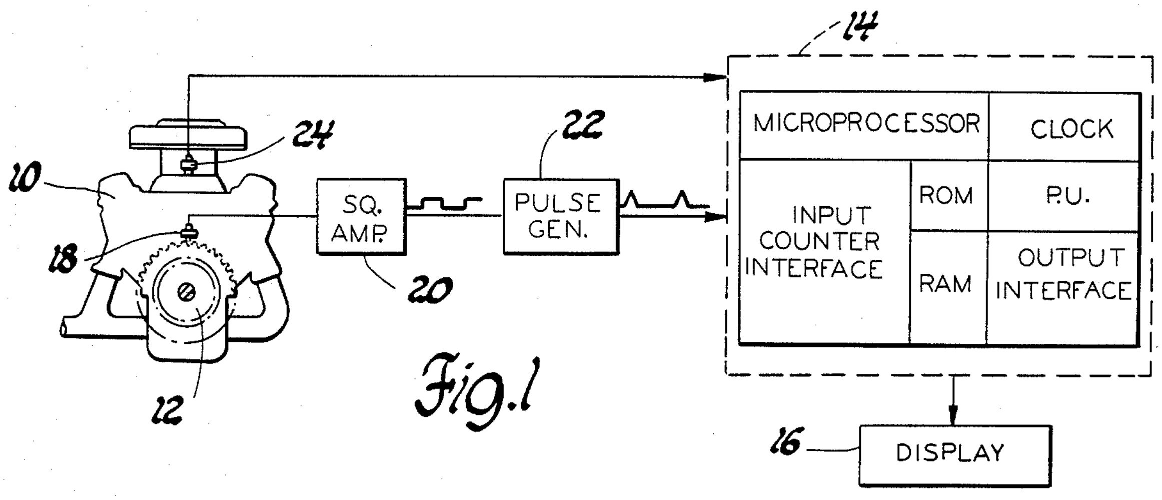
FIG. 1 generally illustrates a diagnostic tool for determining the top dead center position of an internal combustion engine.

Referring now to FIG. 1, there is illustrated a diagnostic tool for determining the top dead center position of an engine 10 in accord with this invention, the determined top dead center position then providing a basis for diagnosing engine timing or other related parameters based on top dead center position. The engine 10 may be either a spark ignited gas engine or a diesel engine. The engine 10 includes a ring gear 12 mounted on and rotated by the engine crankshaft and which has teeth equally spaced around its circumference at typically 2 to 4 degree intervals.

The diagnostic tool includes a conventional computer 14 comprised of, for example, a microprocessor, a clock, a read-only memory, a random access memory, a power supply unit, an input counter interface and an output interface. The computer 14, upon a manual input command or upon sensing certain engine conditions, executes an operating program stored in its read-only memory. This program includes steps for reading input data and timing intervals via the input counter interface, processing the input data and providing for an output such as to a display 16 via the output interface. The display 16 may take the form of a printer or a video monitor for displaying various information relating to the diagnostic procedure.

The diagnostic tool also includes a pair of probes one of which is an electromagnetic speed sensor 18 positioned adjacent the teeth on the ring gear 12 for providing crankshaft angle and speed information to the computer 14. In this respect, the electromagnetic speed sensing probe 18 senses the passing of the teeth of the ring gear 12 as it is rotated and provides an alternating output to a zero crossing responsive square wave amplifier 20 whose output is a square wave signal at the frequency of the alternating input from the speed sensor 18. This square wave signal is provided to a pulse generator 22 which provides a pulse output with the passing of each tooth on the ring gear 12. Each pulse output of the pulse generator 22 is separated by a crankshaft angle equal to the angular spacing of the teeth on the ring gear 12. Therefore the time interval between pulses is inversely proportional to engine speed and the frequency of the pulses is directly proportional to engine speed.

The second probe of the diagnostic tool takes the form of a sound transducer 24 for sensing the onset of combustion in a reference cylinder. This transducer may take the form of a piezoelectric sensor mounted at a location for sensing the noise associated with the onset of combustion in the reference cylinder.

In general, the diagnostic tool of FIG. 1 times and records the time intervals between successive pulses from the pulse generator 22 corresponding to the time interval between successive crankshaft positions defined by the teeth on the ring gear 12. The number of intervals timed and recorded corresponds to two revolutions of the crankshaft representing one complete engine cycle. In another embodiment, only the number of intervals defining one complete speed cycle associated with the reference cylinder are timed and recorded. Additionally, the time of occurrence of the onset of combustion in the reference cylinder as sensed by the transducer 24 is recorded. The computer 14 in accord with the program stored in its ROM then determines the angular position of the crankshaft at a minimum point in the speed cycle of one of the cylinders as an approximation of top dead center position of the cylinder piston. Thereafter, a correction factor based on data stored in the read-only memory is summed with the approximated location of top dead center to determine the precise location of top dead center. From this value, various top dead center related parameters can be determined and displayed on the display 16.

Figure 2:
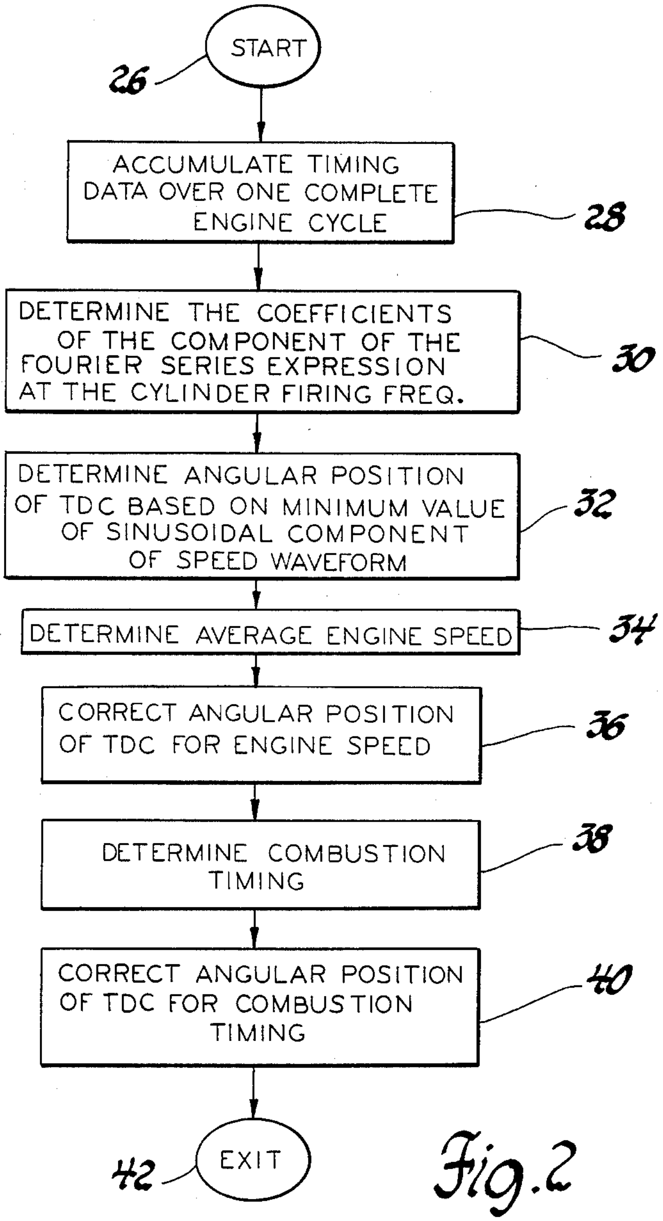
FIG. 2 is a flow diagram illustrating the operation of the diagnostic tool of FIG. 1 in determining the location of top dead center position of the internal combustion engine.

Referring to FIG. 2, the steps executed by the program stored in the read-only memory of the computer 14 of FIG. 1 for determining the precise location of top dead center position of the engine 10 is illustrated. The program executed by the computer 14 is initiated at step 26 upon command from an operator. In another embodiment, the program is initiated upon a detected condition of the engine such as the sensing of the onset of combustion in the reference cylinder provided by the transducer 24. Thereafter, the program proceeds directly to step 28 where the time interval between successive teeth on the ring gear 12 is measured via the input counter interface and stored in a corresponding random access memory location. This data is accumulated for successive teeth on the ring gear for two revolutions of the crankshaft corresponding to one complete engine cycle (in a four cycle engine). Accordingly, the number of intervals timed and stored is equal to 2N, where N is the number of teeth on the ring gear 12.

In general, each timed interval is a digital number having a value equal to the number of clock pulses from the computer clock between pulses from the pulse generator 22. This number represents the time for the crankshaft to rotate through the angle defined by two adjacent teeth on the ring gear 12 and is inversely proportional to speed. Therefore, the numbers stored are representative of instantaneous engine speed with a resolution limited by the spacing of the ring gear teeth.

The first ring gear tooth to pass the transducer 18 defines a reference crankshaft angle. The subsequent timed interval values are stored in specified sequential random access memory locations so that the instantaneous speed stored in any given memory location can be associated with a particular crankshaft angle relative to the reference angle. For example, if the angular spacing between the teeth is 2°, the seventh timed interval represents the instantaneous engine speed at 14° crank angle after the reference angle. The 2N numbers stored during execution of step 28 define the instantaneous speed profile of the engine 10 over one complete engine cycle which is two revolutions of the crankshaft for a four cycle engine. A typical stored profile for an eight cylinder engine is illustrated in the engine speed curve of FIG. 3. Also during step 28, when the transducer 24 senses the onset of combustion in the reference cylinder, the count in the tooth time interval counter at that moment is stored in a random access memory location along with the memory location at which the last tooth time interval was stored. These stored values allow the program to subsequently determine the crankshaft angular position of the onset of combustion relative to the reference angle.

From step 28, the program proceeds to determine the crankshaft angular position of a minimum speed point in the stored speed profile relative to the reference angle. In one embodiment, the crankshaft angle relative to the reference angle represented by the random access memory location at which the maximum count in the first speed cycle is stored is used as the minimum speed point. However the accuracy of this angle in representing the minimum speed point is limited by the angular spacing of the teeth on the ring gear 12, which may be on the order of 2°–4°.

In this embodiment, a substantially higher resolution in the determination of the angle at which the minimum speed occurs is obtained by fitting a mathematical expression to the stored instantaneous speed values and then determining the angle at which that expression is minimum. Establishing a polynomial expression at least around the first point of minimum speed may be utilized in accurately determining the minimum speed angle. In the preferred embodiment, however, a discrete Fourier transform is applied to the stored speed data to extract the firing frequency sinusoidal component. The minimum value of this sinusoidal component (illustrated in FIG. 3) can be accurately located without the limitation imposed by ring gear teeth spacing.

In step 30 the coefficients a and b of the cosine and sine components of the Fourier series expression at the firing frequency are determined. In one embodiment, a Fourier transform may be applied to a single cycle of the speed waveform beginning at the reference crankshaft angle. However, if the operation of the cylinders is not identical for reasons including a cylinder-to-cylinder variation in the injected fuel, the resulting harmonics in the engine speed waveforms influence the coefficients a and b of the cosine and sine components of the Fourier series on a cycle-to-cycle basis. In the present embodiment, a Fourier transform is applied to the complete 720° of recorded speed data so that the influence of all of the cylinders are accounted for. This results in an averaging effect in the determination of the cosine and sine coefficients a and b of the Fourier series.

Techniques for determining the cosine and sine coefficients are well known. One such technique is sometimes referred to as analysis by numerical integration. In this technique, the sine coefficient $$b \approx \frac{1}{k} \sum_{i=1}^{i=k} y_i \cdot \sin x_i$$

where k is the number of instantaneous speed values stored in step 28 over one complete engine cycle (equal to the number of teeth in 720° crankshaft angle), y is the instantaneous speed value stored and x is the crankshaft angle represented by the memory location at which the instantaneous speed value is stored. Similarly, the cosine coefficient $$a \approx \frac{1}{k} \sum_{i=1}^{i=k} y_i \cdot \cos x_i.$$

In determining these coefficients, the sin and cos values may be stored in look-up tables in the read-only memory.

Figure 3:
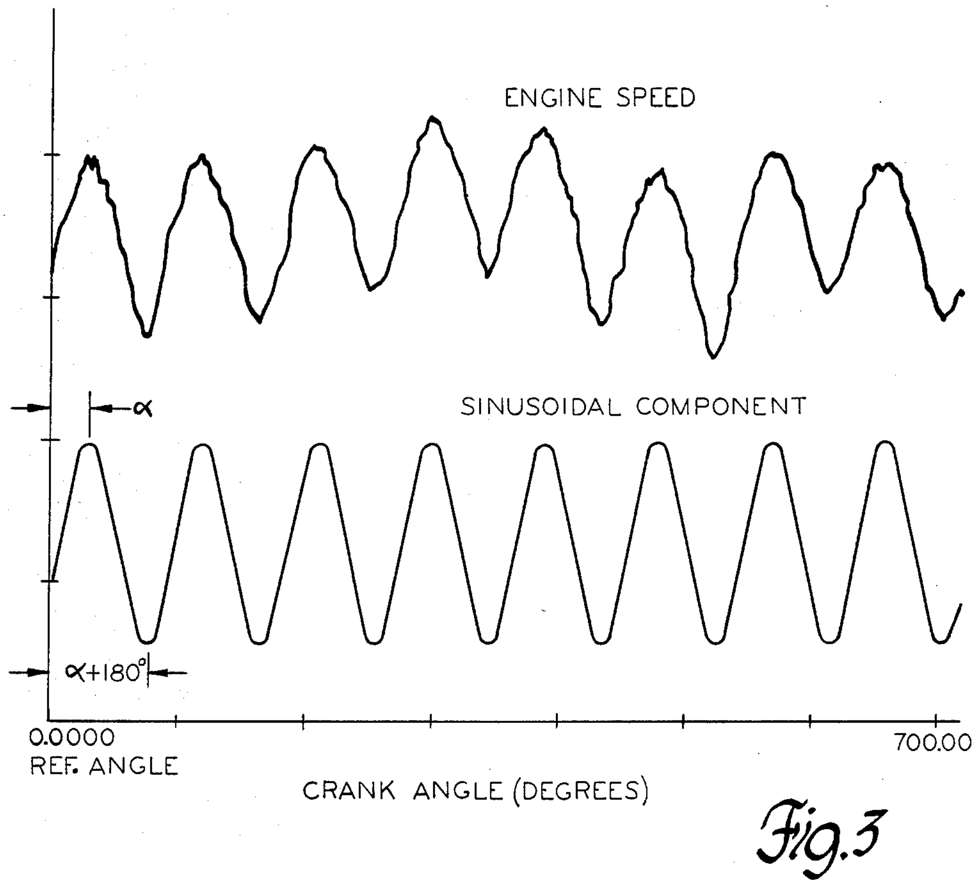
FIG. 3 is a diagram illustrating a typical trace of engine speed and the sinusoidal component extracted therefrom.

In the next step 32, an approximation of the crankshaft angular location of the earliest top dead center position after the reference angle based on the minimum speed point represented by the first minimum value point of the sinusoidal component is determined. The earliest crankshaft angle at which the sinusoidal component is minimum is established by determining via a look-up table the angle $\alpha$ whose tangent is equal to b/a and adding 180°. As illustrated in FIG. 3, the angle $\alpha$ is the angle between the reference angle and the first maximum point of the sinusoidal component. By adding 180° to this angle, the precise location of the earliest minimum point of the sinusoidal component corresponding to the minimum speed of the engine is determined. This angle is not limited by the resolution obtained from the ring gear teeth and accordingly provides a more accurate representation of the minimum speed point in the speed trace.

Figure 4:
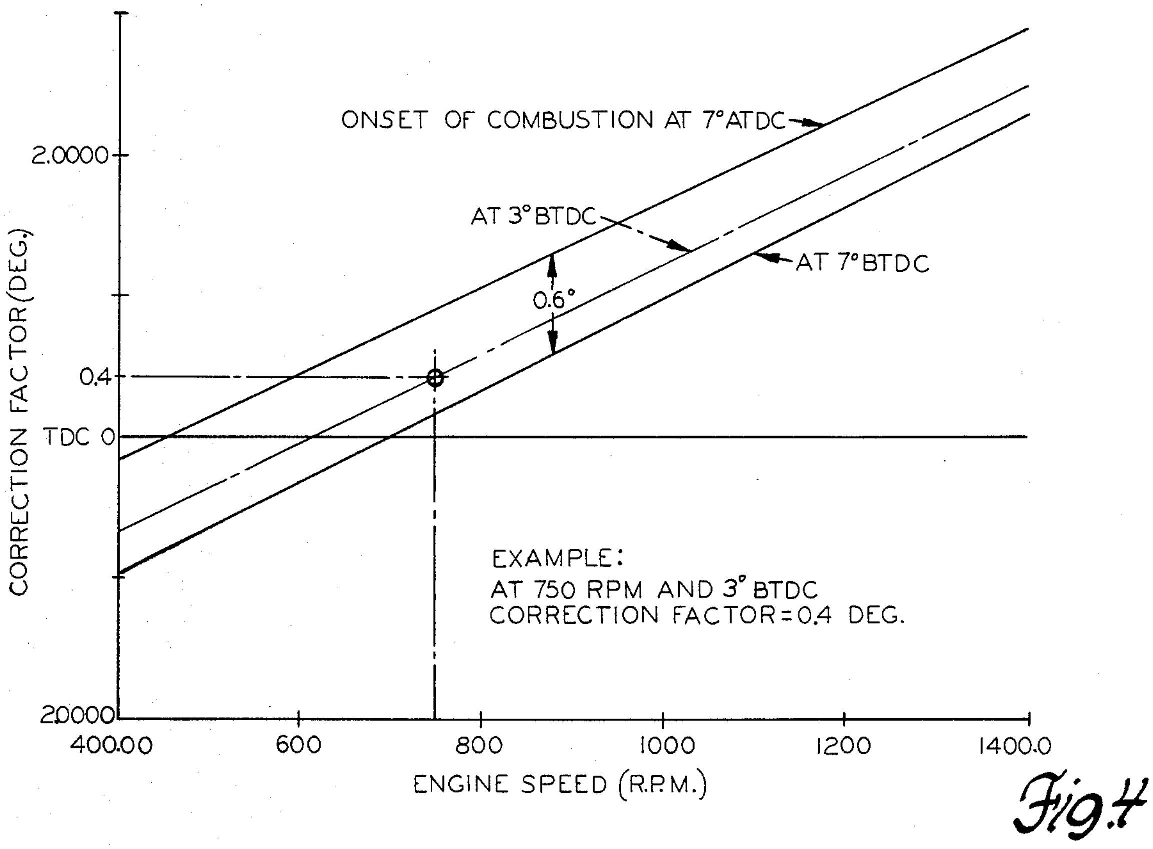
FIG. 4 is a diagram illustrating the predetermined stored corrections applied to the crankshaft angle location of minimum speed during a combustion cycle for determining the precise location of piston top dead center position.

Following step 32, the program proceeds to a step 34 where the average engine speed is determined based on the instantaneous speed values stored at step 28. From step 34, the program proceeds to step 36 where the approximation of the crankshaft angular location of top dead center provided at step 32 is corrected based on the predetermined speed dependent correction value stored in the read-only memory of the computer 14 of FIG. 1. This engine speed correction is the major element in the difference between the minimum speed point determined at step 32 and top dead center. As seen in the one engine example of FIG. 4, the engine speed correction establishes piston top dead center to within 0.6 degrees.

The speed corrected top dead center position determined at step 36, while not yet corrected for combustion timing, serves as a good approximation of top dead center in determining the value of combustion timing from which the combustion timing correction value is determined. The engine combustion timing is determined at step 38. This determination is based on the count stored at the moment onset of combustion was sensed in step 28 and the memory location at which the prior instantaneous speed value was stored. Since the stored memory location is associated with a particular crankshaft angle relative to the reference angle, the precise crankshaft angular location of the onset of combustion relative to the reference angle is determined by adding to that particular angle the portion of the angular spacing between ring gear teeth represented by the ratio of the count in the tooth time interval counter stored at the sensed onset of combustion and the total count stored in the random access memory at the end of the timed interval within which the onset of combustion occurred. Combustion timing is then determined based on the angular difference between the top dead center location determined at step 32 and the onset of combustion angular location.

The program next proceeds to step 40 where the speed corrected angular position of top dead center is further corrected based on the predetermined combustion timing dependent correction value stored in the computer 14 read only memory.

In another embodiment, a more precise combustion timing dependent correction value may be obtained by re-determining the combustion timing based on the corrected angular position of top dead center established at step 40. This iterative process may be repeated as many times as required to achieve the desired accuracy. However, in most applications, the accuracy achieved by the steps of FIG. 2 is adequate.

In yet another embodiment, the combustion timing dependent correction value may be based on combustion timing angle determined by the difference between the sensed onset of combustion angle and an angle based on the minimum point of the sinusoidal component determined at step 32.

From step 40, the program exits the routine at step 42, ending the top dead center location routine.

The foregoing description of a preferred embodiment of the invention for the purpose of explaining the principles thereof is not to be considered as limiting or restricting the invention since many modifications may be made by the exercise of skill in the art without departing from the scope of the invention.

The embodiments of the invention in which an exclusive property or privilege is claimed are defined as follows:

1. A method of determining the location of top dead center position of at least one cylinder of an internal combustion engine having an output shaft whose instantaneous rotational velocity undergoes cyclic changes at the combustion frequency of the cylinders, the method comprising the steps of:

monitoring the instantaneous rotational velocity of the output shaft;

determining the angular position of the output shaft at which the angular velocity of the output shaft is minimum as an estimation of engine top dead center; and correcting the angular position estimation of engine top dead center with a predetermined velocity and combustion timing dependent correction angle corresponding to the average rotational velocity of the output shaft and the combustion timing angle, whereby the corrected angular position of the minimum angular velocity of the output shaft corresponds substantially to top dead center position of the engine.

2. A method of determining the location of top dead center position of at least one cylinder of an internal combustion engine having an output shaft whose instantaneous rotational velocity undergoes cyclic changes at the combustion frequency of the cylinders, the method comprising the steps of:

monitoring the instantaneous rotational velocity of the output shaft;

determining the average rotational velocity of the output shaft;

determining the angular position of the output shaft at which the angular velocity of the output shaft is minimum as an estimation of engine top dead center;

correcting the angular position estimation of engine top dead center with a predetermined velocity dependent correction angle corresponding to the average rotational velocity of the output shaft;

determining the combustion timing angle between the onset of combustion in the cylinder and the corrected estimated engine top dead center; and compensating the corrected angular position estimation of engine top dead center with a predetermined combustion timing dependent correction angle corresponding to the combustion timing angle, whereby the corrected angular position of the minimum angular velocity of the output shaft corresponds substantially to top dead center position of the engine.

3. A method of determining the location of top dead center position of at least one cylinder of an internal combustion engine having an output shaft whose instantaneous rotational velocity undergoes cyclic changes at the combustion frequency of the cylinders, the method comprising the steps of:

storing predetermined velocity and combustion timing dependent correction angles, each correction angle representing a difference between the angular position of the output shaft at top dead center position of the cylinder and the angular position at which the output shaft angular velocity cycle is at its minimum value;

monitoring the instantaneous rotational velocity of the output shaft;

determining the angular position of the output shaft at which the angular velocity of the output shaft is minimum as an estimation of engine top dead center, and correcting the angular position of the minimum angular velocity of the output shaft in accord with the stored velocity and combustion timing dependent correction angle corresponding to the average rotational velocity of the output shaft and the combustion timing angle, whereby the corrected angular position of the minimum angular velocity of the output shaft corresponds substantially to top dead center position of the engine.

4. A method of determining the location of top dead center position of at least one cylinder of an internal combustion engine having an output shaft whose instantaneous rotational velocity undergoes cyclic changes at the combustion frequency of the cylinders, the method comprising the steps of:

monitoring the instantaneous rotational velocity of the output shaft;

extracting the sinusoidal component of the instantaneous rotational velocity of the output shaft;

determining the angular position of the output shaft at which the sinusoidal component of the instantaneous rotational velocity of the output shaft is minimum as an estimation of engine top dead center;

determining the combustion timing angle between the onset of combustion in the cylinder and the estimated engine top dead center; and correcting the angular position estimation of engine top dead center with a predetermined velocity and combustion timing dependent correction angle corresponding to the average rotational velocity of the output shaft and the combustion timing angle, whereby the corrected angular position of the estimation of engine top dead center corresponds substantially to top dead center position of the engine.

* * * * *